No. 755,108. PATENTED MAR. 22, 1904.
A. A. BUSCH, R. GULL & T. J. BARRY.
J. H. BARRY, EXECUTRIX OF T. J. BARRY, DEC'D.
PASTEURIZER.
APPLICATION FILED MAY 26, 1902.
NO MODEL. 4 SHEETS—SHEET 2.
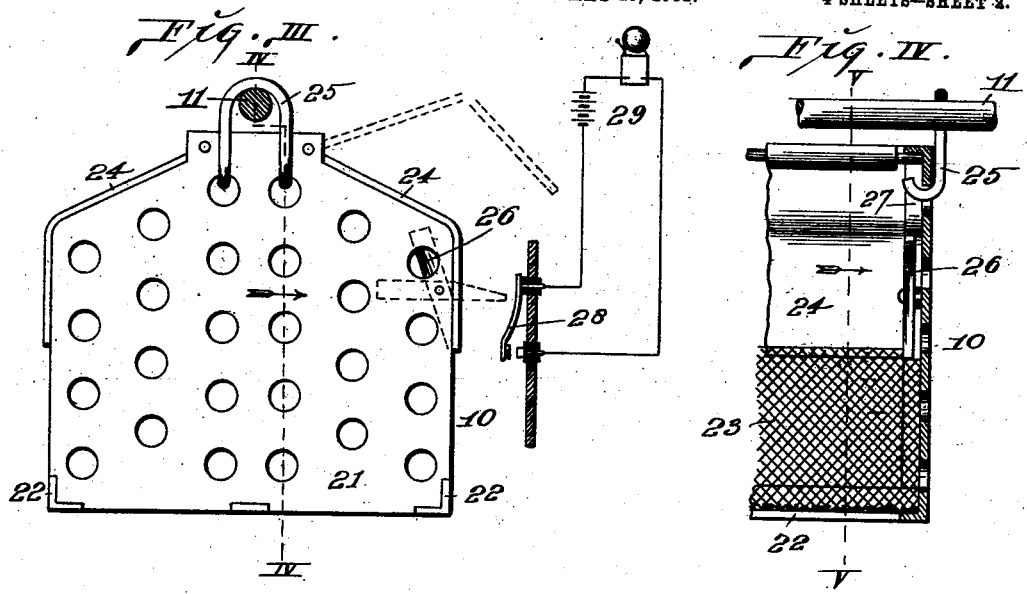
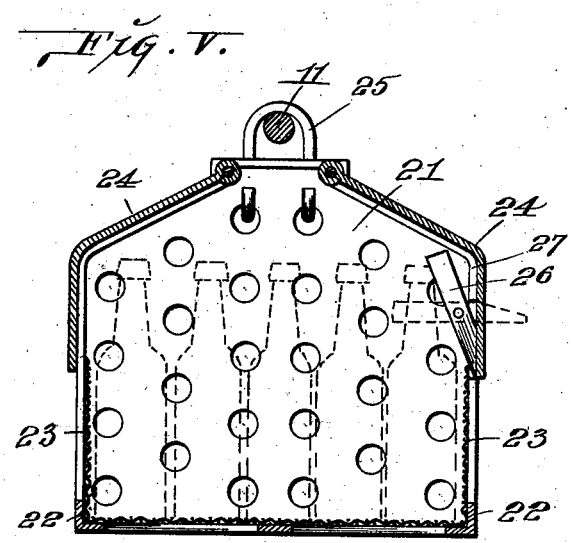
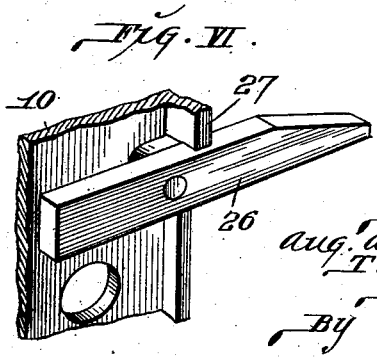

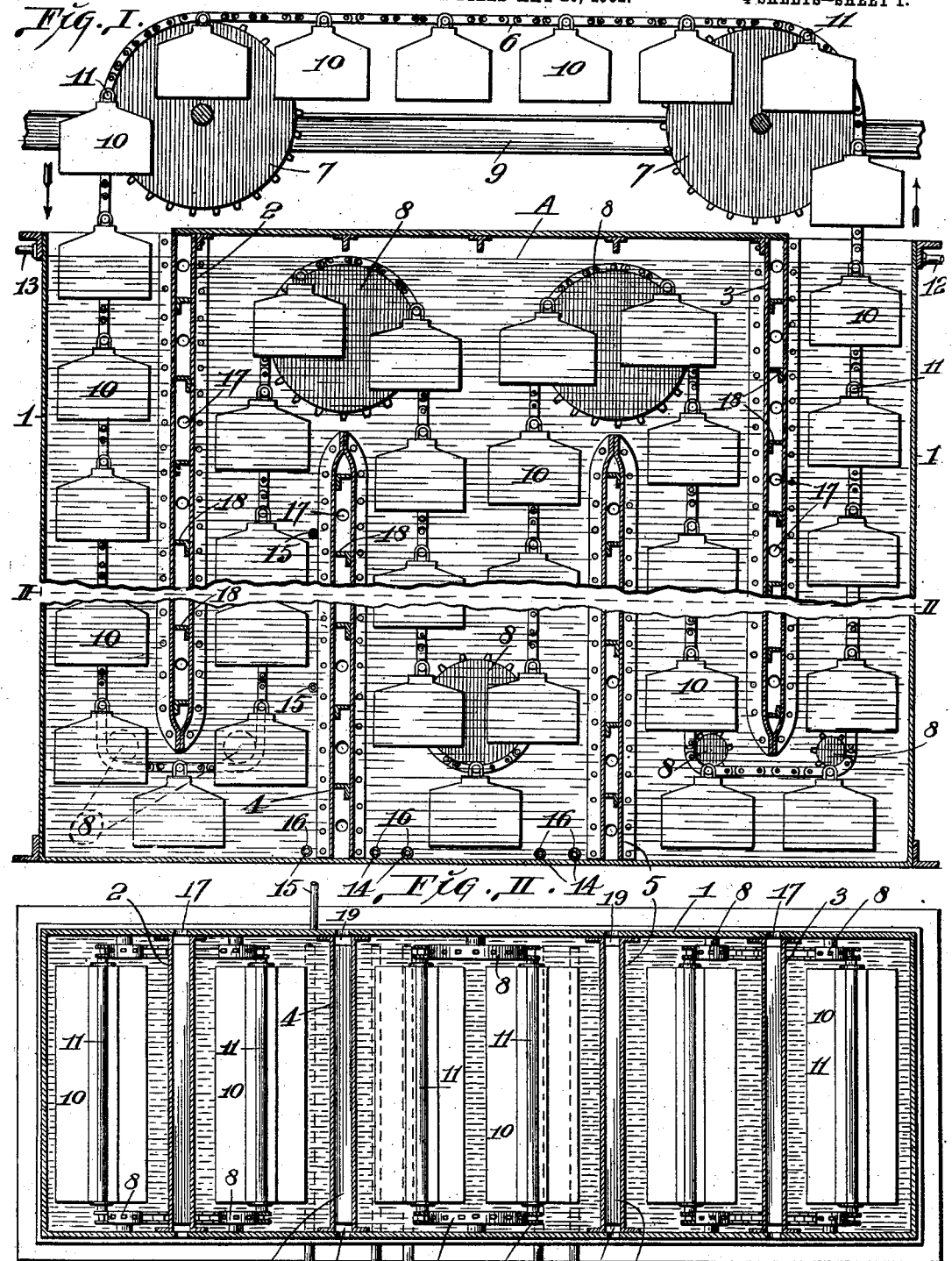

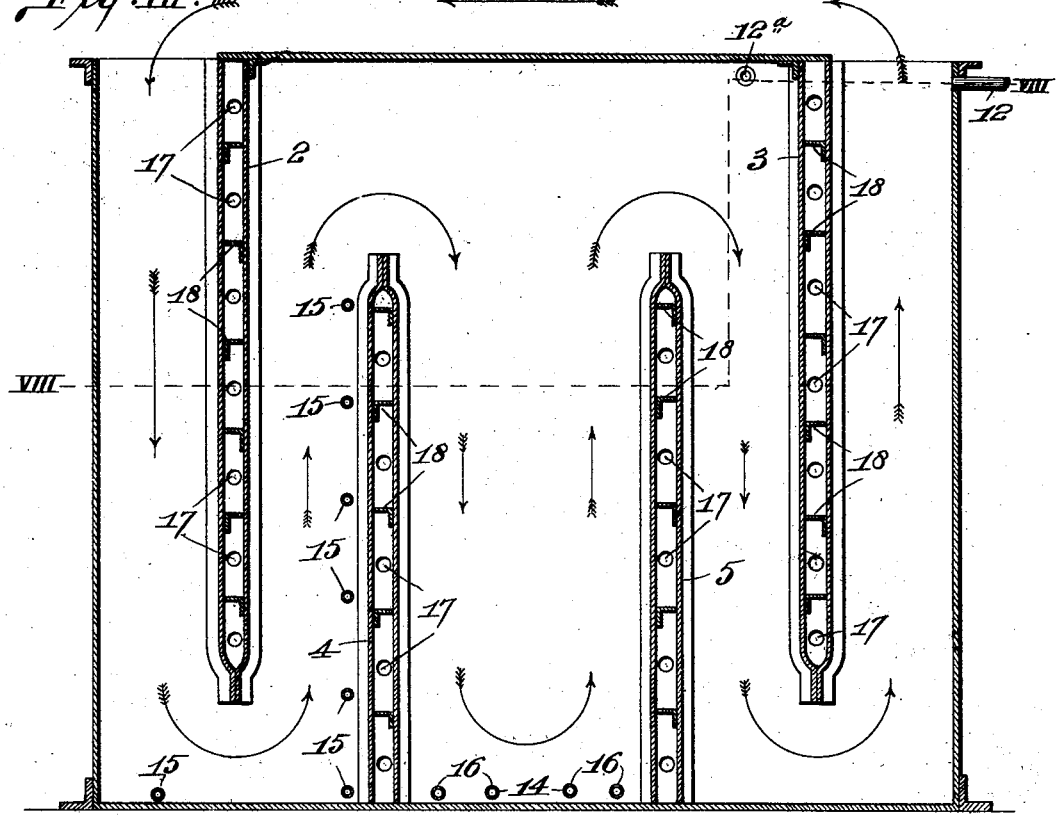

No. 755,108. PATENTED MAR. 22, 1904.
A. A. BUSCH, R. GULL & T. J. BARRY.
J. H. BARRY, EXECUTRIX OF T. J. BARRY, DEC'D.
PASTEURIZER.
APPLICATION FILED MAY 26, 1902.
NO MODEL. 4 SHEETS—SHEET 4.
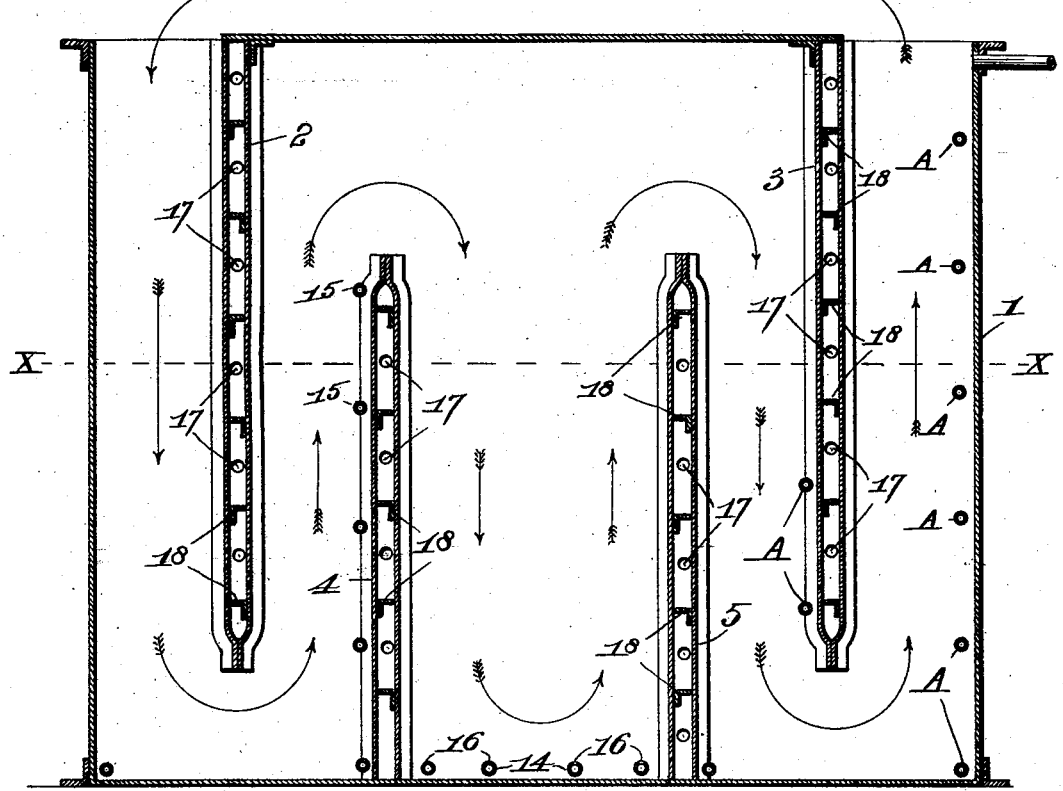
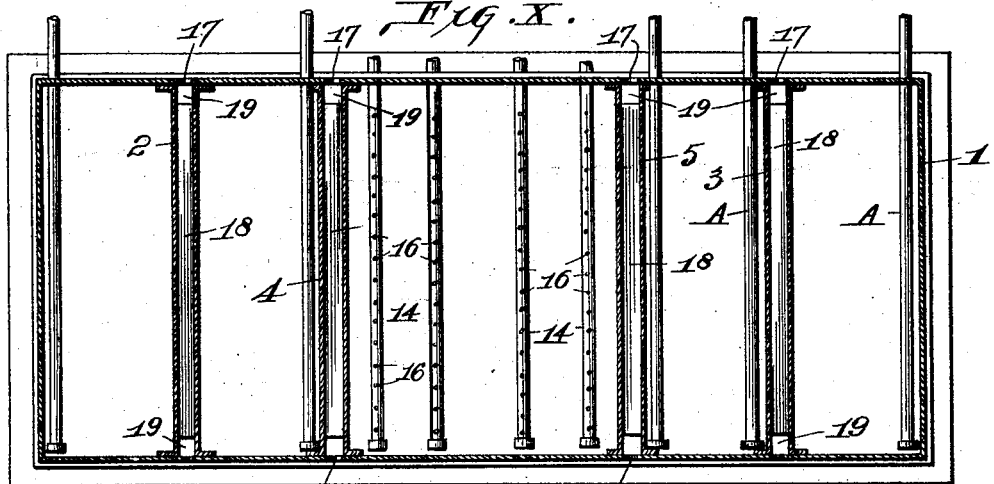

No. 755,108. Patented March 22, 1904.

UNITED STATES PATENT OFFICE.

AUGUST A. BUSCH, RUDOLF GULL, AND THOMAS J. BARRY, OF ST. LOUIS, MISSOURI; JOSEPHINE H. BARRY EXECUTRIX OF SAID THOMAS J. BARRY, DECEASED.

PASTEURIZER.

SPECIFICATION forming part of Letters Patent No. 755,108, dated March 22, 1904.

Application filed May 26, 1902. Serial No. 108,924. (No model.)

*To all whom it may concern:*

Be it known that we, AUGUST A. BUSCH, a citizen of the United States, RUDOLF GULL, a citizen of Switzerland, and THOMAS J. BARRY, a citizen of the United States, all residing in the city of St. Louis, in the State of Missouri, have invented certain new and useful Improvements in Pasteurizers, of which the following is a full, clear, and exact description, reference being had to the accompanying drawings, forming part of this specification.

The object of our invention is to produce a pasteurizer in which the beer contained in bottles is conveyed first through attemperating-water, then through water of maximum temperature to sterilize the beer, and thence through cooling-water, the construction of the pasteurizer being such that the bottles do not leave the water-bath from the time they enter the attemperating-water until they leave the cooling-water, thus avoiding danger of broken bottles resulting from their exposure to the atmosphere while passing from one stage of water to another and likewise avoiding the accumulation on the bottles of suspended matter in the water, which is objectionable inasmuch as the suspended matter will dry on and stick to the bottles if the latter are passed through the atmosphere in a hot condition.

A further object of our invention is to produce a pasteurizer in which the temperature of the water in one compartment does not by radiation materially affect the temperature of the water in the other compartments.

A further object of our invention is to construct a basket or receptacle for holding the bottles, into which the bottles can be readily placed and readily removed and which is provided with a "telltale" attachment, so that an alarm will be sounded if the cover is not closed before the basket enters the machine.

Our invention consists in features of novelty hereinafter fully described, and pointed out in the claims.

Figure I is a vertical longitudinal section of our improved pasteurizer. Fig. II is a horizontal section taken on line II II, Fig. I. Fig. III is an end view of one of the baskets and a detail section of the wall of the tank, showing the electric alarm. Fig. IV is a detail section taken on line IV IV, Fig. III. Fig. V is a section taken on line V V, Fig. IV. Fig. VI is a detail perspective view of one of the baskets. Fig. VII is a vertical section of a modified form of the tank portion of the pasteurizer. Fig. VIII is a horizontal section taken on line VIII VIII, Fig. VII. Fig. IX shows another modified form of the tank portion of the pasteurizer. Fig. X is a horizontal section taken on line X X, Fig. IX.

1 represents a tank having outer partitions 2 and 3 near each end of the tank and inner partitions 4 and 5. The partitions 2 and 3 extend from the top of the tank in a downwardly direction, but not to the bottom of the tank, while the partitions 4 and 5 extend upwardly from the bottom of the tank, but not to the top thereof.

6 represents endless chains that travel over and under pulleys or chain-wheels 7 and 8 (the pulleys 7 being journaled to a frame 9, located over the tank, while the pulleys 8 are journaled in the sides of the tank) and between which the bottle-receiving baskets or receptacles 10 are supported on rods 11. The chains and baskets constitute a carrier, that passes into the machine between one end thereof and the partition 2, thence under the partition and upwardly between it and the partition 4, thence over the partition 4 and downwardly and upwardly between it and the partition 5, thence over the partition 5 and downwardly between it and the partition 3, and thence beneath the partition 3 and upwardly between it and the other end of the tank, from where it passes out of the machine and over the pulleys 7. The bottles are placed in the baskets as they enter the tank and are removed therefrom as the baskets leave the tank.

12 is the water-supply and 13 the waterdischarge pipe of the tank. The water-level in the tank is shown at A, Fig. I, and the upper pulleys or wheels 8 are located beneath this line, so that the bottles remain in the water from the time they enter the machine until they leave it, although they are passed through water of different degrees of temperature, the change from one temperature to another being gradual, and by virtue of not being exposed to the atmosphere there is avoided the danger of breaking the bottles and the collection of foreign matter on the bottles.

The water in the central part of the tank is heated by steam coils or pipes 14, and the water in the compartment to the left of partition 4 may, if necessary, be heated by steam-pipes 15, all of these pipes being preferably perforated within the tank, as shown at 16.

The partitions 2, 3, 4, and 5 are formed with double walls closed at their ends, as shown in Fig. I, so that each partition has a live-air chamber within it. These chambers are open to the outside atmosphere, for which purpose the side walls of the tank are perforated, as shown at 17. With the partitions thus made substantially no heat will radiate through them from one compartment to another, and the temperature of the water in the different compartments can be predetermined and maintained. The walls of the partitions are held apart against the pressure of the water by angle-strips 18, located between the walls, but which do not extend entirely across the partitions, as shown at 19, Fig. II, and thus the circulation of air within the chamber is not prevented by the strips.

The baskets 10 have end walls 21, made of perforated metal and joined at their bottom by angle-pieces 22. 23 represents a wire-netting covering the bottom of the baskets and extending up on each side to about midway of the height of the baskets. 24 represents doors hinged to the perforated ends of the baskets and which extend down, as shown, to about the top or upper edge of the wire-netting 23. The doors can be opened up into a vertical position, thus allowing for access to the baskets in placing the bottles into them and removing the bottles therefrom, one of the doors being shown partially raised in Fig. III. The baskets are suspended from the rods 11 by means of U-shaped stirrups 25, the lower ends of which are formed into hooks and passed through the upper perforations in the ends of the baskets, as shown in Fig. V.

It is important that the doors 24 be closed when the baskets are passing through the machine, so that in case a bottle should become broken the pieces will not float out of the baskets, and to provide against the doors being accidentally left open and the baskets passing into the machine without it being noticed that the doors are open we provide a telltale arrangement consisting of a bar or trigger 26, that is pivoted to one end of the basket, as shown in Fig. VI. The inner end of this bar is heavier than the outer end, so that when the door on this side of the basket is opened, which is the door through which the bottles are placed into the baskets, the bar will fall into a horizontal position, in which position it is held by an overhanging flange 27 on the end of the basket. If the door is closed, this bar will be forced into the position shown in Fig. III; but if the door is not closed the bar will stand in the position shown in Fig. VI and by dotted lines in Fig. III, and its outer end will come against a spring contact-bar 28 of an electric bell 29, the spring contact-point being fastened to the wall of the tank. As the basket descends (when the door is left open) the outer end of the bar 26 will come against the contact-point 28 and sound the alarm, whereupon the operator will close the door.

With the tank of the pasteurizer constructed as shown in Figs. I and II there is a circulation of water through the conduit from pipe 12 to pipe 13; but this circulation of water is not essential, and the tank can be made as shown in Figs. VII and VIII, the cooling-water passing in through pipe 12, as in the other case, and out through a pipe 12ª, located on the far side of the partition 3 from the pipe 12. With this construction of tank we prefer to use more of the heating-pipes 15 than in the construction shown in Fig. I. Again, the machine can be made to operate without the circulation of water through any part of the tank. This arrangement is shown in Figs. IX and X, where A represents cooling-pipes for keeping down the temperature of the water on the delivery side of the machine.

We claim as our invention—

1. In a pasteurizer, a tank formed into compartments by means of upwardly and downwardly extending partitions; said partitions being formed with air-chambers and the walls of said partitions being supported by means of strips that do not extend entirely across the partitions; the walls of said tank being perforated opposite the partitions, substantially as set forth.

2. In a pasteurizer, the combination of a tank divided into compartments, endless chains passing through the compartments, and baskets carried by said chains, said baskets consisting of perforated end pieces and wire-gauze bottoms and sides, and having doors hinged at their upper ends to the ends of the baskets, substantially as set forth, 3. In a pasteurizer, the combination of a tank divided into compartments, endless chains passing through the compartments, baskets carried by the chains and having hinged doors, bars pivoted to the baskets and which are adapted to be moved to an inclined position by the closing of the doors and to be held in a horizontal position if the doors are not closed, and an electric bell adapted to be sounded by said bars when in a horizontal position, substantially as and for the purpose set forth.

AUG. A. BUSCH.
RUDOLF GULL.
THOMAS J. BARRY.

In presence of—
E. S. KNIGHT,
NELLIE V. ALEXANDER.